United States Patent [19]

Boschetto et al.

[11] Patent Number: 5,644,462

[45] Date of Patent: Jul. 1, 1997

[54] ELECTRICAL POWER/GROUND CONTINUITY INDICATOR PROTECTION CIRCUIT

[75] Inventors: Andrew A. Boschetto, Sewell, N.J.; Michael Jacobs, Westfield, Pa.

[73] Assignee: International Marketing Corporation, Sewell, N.J.

[21] Appl. No.: 603,196

[22] Filed: Feb. 20, 1996

Related U.S. Application Data

[63] Continuation of Ser. No. 145,853, Nov. 5, 1993, abandoned.

[51] Int. Cl.[6] .................................... H02H 3/20
[52] U.S. Cl. ................ 361/91; 361/111; 340/641
[58] Field of Search .................... 361/56, 58, 91, 361/110, 111, 119; 324/133; 340/635, 641, 649–654, 656

[56] References Cited

U.S. PATENT DOCUMENTS

| 1,665,987 | 4/1928 | Smith . | |
| 1,720,463 | 7/1929 | Both . | |
| 1,935,771 | 11/1933 | Feurstein et al. | 177/311 |
| 2,112,137 | 3/1938 | Brach | 177/311 |
| 2,449,150 | 9/1948 | Schnoll | 177/311 |
| 2,474,407 | 6/1949 | Todd et al. | 177/311 |
| 2,503,677 | 4/1950 | McHenry et al. | 177/311 |
| 2,731,629 | 1/1956 | Siderman | 340/252 |
| 3,020,518 | 2/1962 | Camping et al. | 339/191 |
| 3,171,113 | 2/1965 | McNamara | 340/255 |
| 3,559,200 | 1/1971 | Walters | 340/255 |
| 3,588,861 | 6/1971 | Meyer | 340/252 |
| 3,611,257 | 10/1971 | Carkhuff | 339/63 M |
| 3,753,261 | 8/1973 | Thaxton | 340/252 P |
| 3,757,102 | 9/1973 | Roberts | 240/2 R |
| 3,924,914 | 12/1975 | Banner | 339/14 P |
| 4,118,690 | 10/1978 | Paynton | 340/656 |
| 4,298,864 | 11/1981 | Mahnke et al. | 340/657 |
| 4,386,818 | 6/1983 | Millhimes et al. | 339/113 L |
| 4,520,239 | 5/1985 | Schwartz | 191/12.4 |
| 4,671,597 | 6/1987 | Grill | 362/253 |
| 4,713,653 | 12/1987 | McDermott | 340/654 |
| 4,861,288 | 8/1989 | Friedman | 439/736 |
| 5,086,294 | 2/1992 | Kasegi | 340/641 |
| 5,207,594 | 5/1993 | Olson | 439/490 |

FOREIGN PATENT DOCUMENTS 717200 8/1965 Canada .

Primary Examiner—Jeffrey A. Gaffin
Assistant Examiner—Ronald W. Leja
Attorney, Agent, or Firm—Longacre & White

[57] ABSTRACT

The present invention concerns an electrical power cord having an illuminated connector including a circuit to protect a power and/or ground continuity indicator incorporated into the connector. The connector is illuminated if it is connected to an active power source with or without a functioning ground conductor, depending upon the electrical configuration within the connector. The circuit is designed to shield the indicator during an excessive voltage test in accordance with the UL specification for power cords.

8 Claims, 2 Drawing Sheets

ELECTRICAL POWER/GROUND CONTINUITY INDICATOR PROTECTION CIRCUIT

This is a continuation of application Ser. No. 08/145,853, now abandoned filed Nov. 5, 1993, which was abandoned upon the filing hereof.

BACKGROUND OF THE INVENTION (a) Field of the Invention

This invention concerns a circuit for protecting an indicator of either the presence of electrical power to a device, and/or whether the ground circuit protecting the device is functional.

It is known in a standard three-wire power supply system, to provide a ground connection for the safe operation of an electrical device. In the past, it has been common practice to periodically check the device's connection with the power supply, as well as inspect the ground circuit to insure the device is properly and safely connected to the power supply. Routine inspections are time consuming and no guarantee against the power supply connections or ground continuity being broken between inspections.

It is further known to associate an indicator with the electrical device for the purpose of indicating whether the device is connected to an active power supply, and/or properly grounded.

Electrical devices such as power cords incorporating an indicator are required to meet or exceed minimum performance and safety standards established by Underwriter's Laboratory (UL). UL standards pertaining to power cords mandate an excessive test voltage (either 1500 VAC or 2150 VDC) be passed through the power cord for one second in order to determine the heat and fire resistant characteristics of the power cord. In the course of the excess Voltage test, the aforementioned indicators become overloaded and "burn-out".

(b) Description of Related Art

U.S. Pat. No. 4,671,597 to Grill discloses an electrical receptacle having a power indicating light. U.S. Pat. No. 4,606,597 to Bielefeld discloses an electrical connector having an indicator lamp for indicating the availability of electrical current through the connector. U.S. Patent No. 4,520,239 to Schwartz discloses an electrical cord reel and storage system which includes an indicator light which is illuminated when connected to a source of electrical power. U.S. Patent No. 3,924,914 to Banner discloses an electrical safety grounding device including a fuse, a power indicator, and/or a ground continuity indicator. U.S. Pat. No. 3,753,261 (Thaxton), U.S. Pat. No. 3,588,861 (Meyer) and U.S. Pat. No. 3,559,200 (Walters) disclose similar devices to that of Banner. U.S. Pat. No. 3,171,113 to McNamara discloses a modified plug connector having a ground continuity indicator and which is further capable of adapting to either two or three wire systems. U.S. Pat. No. 2,731,629 to Siderman discloses a wiring assembly similar to the device of Grill. U.S. Pat. No. 2,503,677 to McHenry et al. discloses a translucent light bulb socket having a lamp for indicating the location of a defective bulb. U.S. Pat. No. 2,474,407 to Todd et al. discloses a modified plug connector having a polarity indicator for a two wire system. U.S. Pat. No. 2,449,150 to Schnoll discloses a power indicating device similar to that of Thaxton. U.S. Pat. No. 2,112,137 (Brach), U.S. Pat. No. 1,935,771 (Feurstein et al.), U.S. Pat. No. 1,720,463 (Both) and U.S. Pat. No. 1,665,987 (Smith) disclose modified connecting apparatus having power indicators. Canadian Patent 717,200 to Roll et al. discloses an electrical plug connector having an indicating light, however, the device is for a two wire, non-grounded system. In each case, these devices fail to incorporate a circuit protecting their indicator against failure as a consequence of undergoing the aforementioned UL excessive voltage test.

SUMMARY OF THE INVENTION

The present invention comprises a circuit to protect an indicator of the power and/or the adequacy of the ground connection for an electrical device.

One example of an electrical device according to the present invention is a power cord including at least one illuminated indicator embedded within a translucent end connector. The power cord includes a circuit designed to protect the indicator(s) during mandatory UL testing for cord safety. The indicators positively identify when the cord is connected to an active power source and/or an activated power source having a functional ground conductor.

DESCRIPTION OF THE PREFERRED EMBODIMENT

Figure 1:
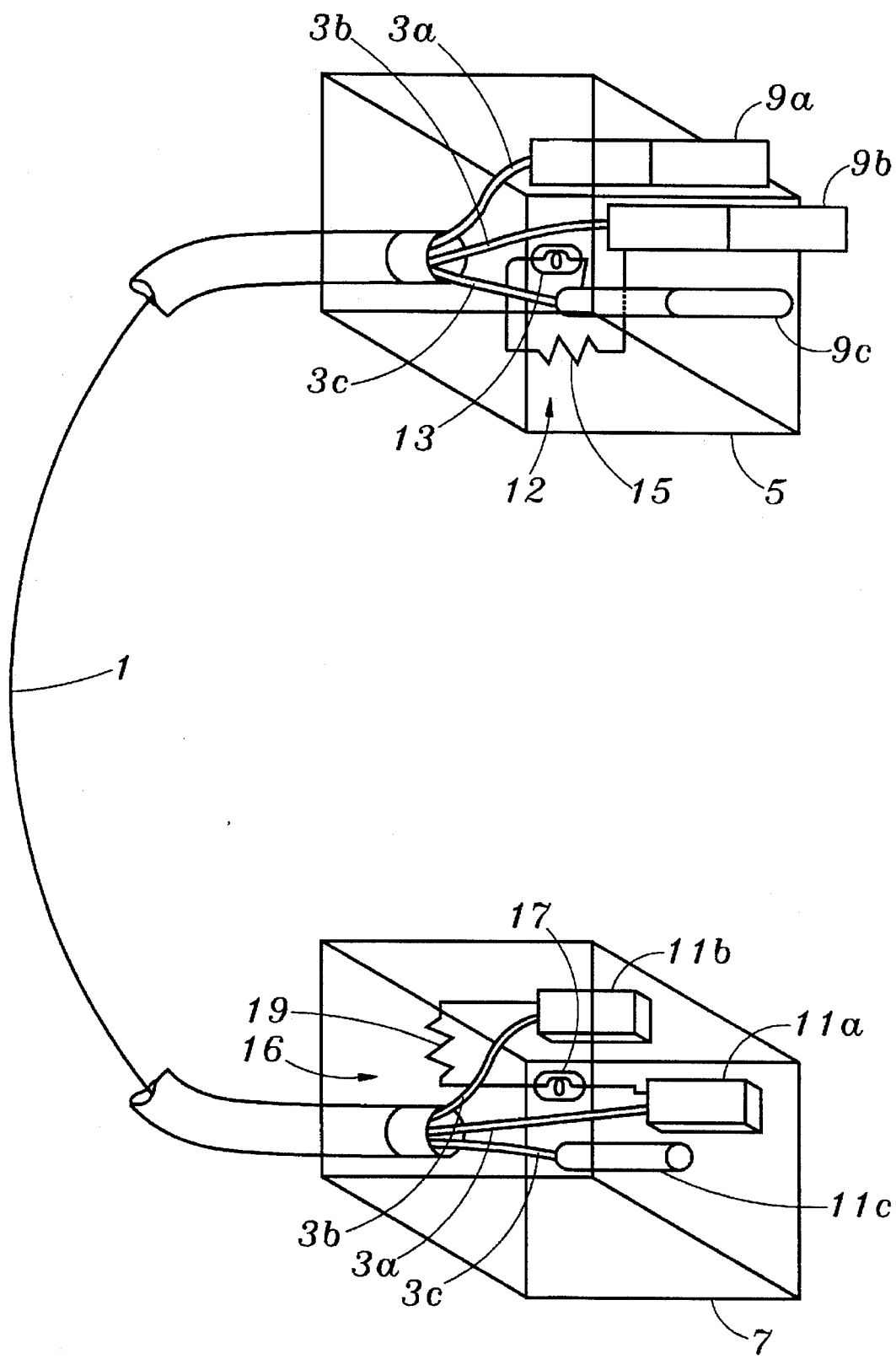
FIG. 1 is a partially schematic isometric view of the prior art.

Referring to the drawings, an elongated flexible cable 1 contains a plurality of wire conductors 3a, 3b, 3c. Conductors 3a, 3b, commonly referred to as the "hot" and neutral conductors, convey electrical power to and from a source. Conductor 3c, commonly referred to as the ground conductor, provides a path for electricity to flow in the event of a short circuit, for the sake of preventing injury or damage.

At respective distal ends of the flexible cable 1 are a first body 5 and a second body 7. The first body 5 is commonly referred to as a male connecting end because a plurality of conductive prongs 9a, 9b, 9c partially project out from the first body 5. The second body 7 is commonly referred to as a female connecting end because a plurality of receptacles 11a, 11b, 11c extend into the second body 7. The first and second bodies 5, 7 are formed from a translucent material and hold the respective prongs 9a, 9b, 9c and receptacles 11a, 11b, 11c in a standard pattern such that the first body 5 may be mated to the second body 7 with a plurality of non-intersecting conductive loops resulting.

Embedded within the first body 5 is a first type of indicator 12 which, when illuminated, indicates positively that the power cord is connected to an active power source including a functional ground conductor. The first indicator 12 includes a first electric bulb 13 series connected to a first resistor 15. The first indicator 12 is connected at one end to either the "hot" or neutral conductor 9a, 9b, and at the other end to the ground conductor 9c.

Embedded within the second body 7 is a second type of indicator 16 which, when illuminated, indicates positively that the cord is connected to an active power source. The second indicator 16 includes a second electric bulb 17 series connected to a second resistor 19. The second indicator 16 is connected at one end to one of the "hot" or neutral conductors 9a, 9b, and at the other end to the other of the "hot" or neutral conductors 9a, 9b.

It is anticipated that either of the types of indicators 12, 16 may be embedded within the first and second bodies 5, 7 and that a single cord may have only one indicator, two of the same type of indicator, or one of each type of indicator (as shown in the drawings).

The electric bulbs may be neon bulbs and the resistors are sized to create a significant voltage drop whereby the electric bulb receives a minimal current for maximizing bulb life expectancy. It is also anticipated that other types of electric bulbs, such as light emitting diodes (LED's) may be used with or without a series resistor.

Figure 2:
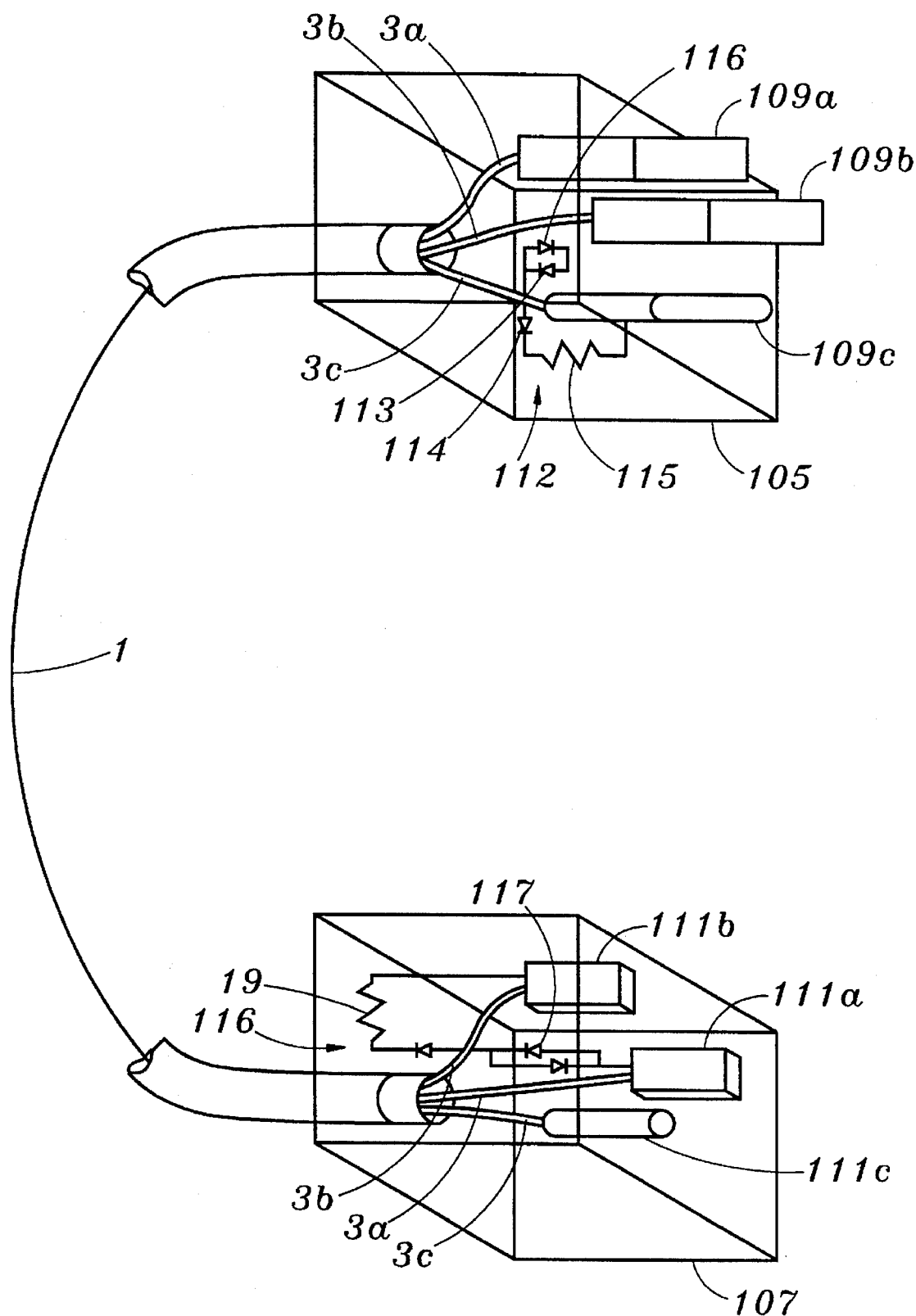
FIG. 2 is a partially schematic isometric view of the present invention incorporated into a power extension cord.

In the preferred embodiment of the present invention, the circuit design illustrated in FIG. 2 is incorporated to protect the indicator from being burned out during the excess voltage test set forth by UL. Specifically, embedded within the first body 105 is a first type of indicator 112 which, when illuminated, indicates positively that the cord is connected to an active power source including a functional ground. The first indicator 112 includes a light emitting diode (LED) 113 which is connected in series with a resistor 115. A first semi-conductor device 114 is connected in series with the LED 113 observing the common polarity of the first semi-conductor device 114 with respect to the LED 113. A second semi-conductor device 116 is connected in parallel with the LED 113 observing the opposite polarity of the second semi-conductor device 116 with respect to the LED 113. Each of the semi-conductor devices 114 and 116 may be either a diode, silicon controlled rectifier, power transistor, etc.

The first semi-conductor device 114 generally isolates the LED 113 when applying the UL excessive DC voltage test, as well as during the positive portion of an AC cycle. It is understood that semi-conductor devices are not 100% efficient, consequently a small current will not be blocked by the first semi-conductor device 114. The second semi-conductor device 116 limits voltage across the LED 113 as a consequence of current leakage through the first semi-conductor device 114 during the positive portion of the AC cycle.

During the negative portion of the AC cycle, current flows from the "hot" conductor 109a, through the LED 113, resistor 115, and the first semi-conductor device 114, to the ground conductor 109c, thereby illuminating the LED 113.

It should be noted that the above described series sequence of components in the circuit design is not limited to the order illustrated as long as the proper semi-conductor device polarity is maintained.

In the preferred design the resistor 115 has a resistance of 5 kΩ, based on a 120 VAC line voltage and assuming a 2 mA current is required to illuminate the LED 113.

With the present invention in place, UL high voltage testing of the insulation may be accomplished without destroying the LED 113. Accordingly, the present invention provides a cost effective means by which to meet the UL safety standard as well as protect the LED 113 against overloads.

Embedded with in the second body 107 is a second type of indicator 116 which, when illuminated, indicates positively that the cord is connected to an active power source. The second indicator 116 comprises the same circuit as described above, but is interposed between the "hot" and neutral connectors 111a, 111b.

The bodies 105,107 are formed by positioning the appropriate prongs, receptacles, and components (already electrically connected) within a mold cavity, introducing the translucent material into the mold, and allowing the translucent material to encase and secure the components.

Because the indicator is ruggedly embedded within the translucent material of the body, it will be resistant to tampering, water as well as other environmental effects, and damage due to abuse. Alternatively, access to the indicator within the body may be provided for replacing the indicator as necessary.

Since the entire body is formed from translucent material, an illuminated indicator within the body will be readily visible from all angles and directions. It is anticipated that providing a textured surface on the exterior of the body and/or adding a pigment to the translucent material may enhance the visibility of the indicator. It is further anticipated that a transparent material could alternatively be used to form the body. Finally, it is anticipated that any powered device cord may incorporate a translucent body including an indicator means.

The drawing and description of the preferred embodiment should not be construed to limit the scope of the invention which is encompassed only by the claims appended hereto.

What is claimed is:

1. An electrical circuit protecting an indicator, said indicator is electrically interposed between a first potential level and a second potential level, said electrical circuit comprising:

a first semi-conductor means for controlling electron flow, said first semi-conductor means generally blocking current flow from said first potential to said second potential;

a second semi-conductor means for controlling electron flow, said second semi-conductor means limiting voltage across said indicator; and said indicator is electrically connected in series with said first semi-conductor means and electrically connected in parallel with said second semi-conductor means;

wherein said electrical circuit and said indicator are embedded within a plug of an electrical power cord, and said indicator indicates positively when said plug is mated to an active power source having a functional ground conductor, and wherein said first and second semi-conductor means permit a surge voltage of about 1500 VAC and 2150 VDC to be passed through said electrical circuit for at least one second without damaging said indicator.

2. The electrical circuit according to claim 1, wherein said plug is translucent and said indicator is a lamp.

3. An electrical cord having at least one indicator indicating the connection of the electrical cord to an active power source, said electrical cord comprising:

elongated flexible cable means for conducting electricity in a plurality of conductors to and from a first connector, a first of the at least one indicator is embedded within said first connector; and, protection means for protecting the at least one indicator from an excessive voltage, said excessive voltage is conducted through said cable means and said first connector, wherein said protection means permit said excessive voltage of about 1500 VAC and 2150 VDC to be passed through said electrical cord for at least one second without damaging said at least one indicator.

4. The electrical cord according to claim 3, wherein said protection means includes a resistor limiting current flow to said indicator, said resistor is electrically connected in series with said indicator, a first semi-conductor means for controlling electron flow, said first semi-conductor means is electrically connected in parallel with said indicator, and a second semi-conductor means for controlling electron flow, said second semi-conductor means is electrically connected in series with said indicator.

5. The electrical cord according to claim 3, wherein said indicator is a light emitting diode.

6. The electrical cord according to claim 3, further comprising:
   a second connector at an end of said cable means opposite said first connector, said first and second connectors are both translucent and each include one of the at least one indicator embedded therein.

7. An electrical cord adapted to be connected to an active power source, said electrical cord comprising:
   at least one indicator means for indicating a connection between said electrical cord and the active power source has been established;
   elongated flexible cable means for conducting electricity in a plurality of conductors to and from a first connector, a first said at least one indicator means is visible within said first connector; and,
   protection means for protecting said at least one indicator means from an excessive voltage, said excessive voltage is conducted through said cable means and said first connector,
   wherein said protection means permit said excessive voltage of about 1500 VAC and 2150 VDC to be passed through said electrical cord for at least one second without damaging said at least one indicator means.

8. The electrical cord according to claim 7, wherein said plurality of conductors include a hot wire, a neutral wire and a ground wire;
   said at least one indicator means and said protection means are interposed between said hot wire and said ground wire to indicate connection of said electrical cord to an active power source having a functioning ground.

* * * * *